United States Patent [19]

Rasshofer et al.

[11] Patent Number: 4,575,518

[45] Date of Patent: Mar. 11, 1986

[54] HOMOGENEOUS STORAGE STABLE SALT-CONTAINING MIXTURE

[75] Inventors: Werner Rasshofer, Cologne; Reiner Paul, Muelheim am Rhein, both of Fed. Rep. of Germany

[73] Assignee: Bayer Aktiengesellschaft, Leverkusen, Fed. Rep. of Germany

[21] Appl. No.: 682,221

[22] Filed: Dec. 17, 1984

[30] Foreign Application Priority Data

Dec. 30, 1983 [DE] Fed. Rep. of Germany ....... 3347574

[51] Int. Cl.$^4$ ............................................. C08G 18/14
[52] U.S. Cl. ........................................ 521/51; 252/182; 521/106; 521/119; 521/120; 521/123; 521/124; 521/125; 521/128; 521/914; 528/48; 528/51; 528/55; 528/57
[58] Field of Search ................... 252/182; 521/51, 106, 521/119, 120, 123, 124, 125, 128, 914; 528/48, 51, 55, 57

[56] References Cited

U.S. PATENT DOCUMENTS

| | | | |
|---|---|---|---|
| B 471,405 | 2/1976 | Barron | 252/182 |
| 3,945,939 | 3/1976 | Barron | 252/182 |
| 4,029,593 | 6/1977 | Schapel et al. | 252/182 |
| 4,141,852 | 2/1979 | Hogan et al. | 252/182 |
| 4,141,952 | 2/1979 | Braun | 264/251 |
| 4,226,756 | 10/1980 | Critchfield et al. | 260/33.2 |
| 4,273,884 | 6/1981 | Dominguez | 521/114 |
| 4,436,841 | 3/1984 | Rasshofer et al. | 521/106 |

FOREIGN PATENT DOCUMENTS

| | | |
|---|---|---|
| 1770703 | 11/1971 | Fed. Rep. of Germany. |
| 2309861 | 8/1974 | Fed. Rep. of Germany. |
| 3219759 | 12/1983 | Fed. Rep. of Germany. |

*Primary Examiner*—Maurice J. Welsh
*Attorney, Agent, or Firm*—Gene Harsh; Joseph C. Gil; Whalen, Lyndanne M.

[57] ABSTRACT

Homogeneous storable mixtures containing small quantities of salts and having a high mixed hydroxyl number of mixed hydroxyl/amine number are made by mixing (a) a polyoxyalkylene polyol and/or polyolamine and/or polyamine based on an alkyloxirane having a molecular weight of from 400 to 12,000, (b) a low molecular weight polyol which is not completely miscible with (a) and a solution-promoting additive in quantities such that for every 100 parts of (a), from 1 to 200 parts of (b) and from 0.01 to 10 parts of (c) are present. The solution-promoting additives are salts of cations of Groups IA, IIA and IIIA of the Periodic System of Elements or ammonium or mono- to tetra-alkylammonium ions and anions formed by removing at least one proton from an acid having a $K_s$-value of at least $10^{-7}$. These mixtures are particularly useful in the production of polyurethanes.

21 Claims, No Drawings

HOMOGENEOUS STORAGE STABLE SALT-CONTAINING MIXTURE

BACKGROUND OF THE INVENTION

The present invention relates to homogeneous storable mixtures containing small quantities of salts and having a high mixed hydroxyl number or mixed hydroxyl/amine number and a high content of low molecular weight di- and/or polyfunctional hydroxyl compounds.

German Offenlegungsschrift No. 1,770,703 discloses that mixtures of polyols which are incompatible with one another can be used for the production of polyurethanes. End products having improved properties, such as high thermal stability and high impact strength, can be obtained in this way. German Offenlegungsschrift No. 2,309,861 extended this principle of using incompatible polyol mixtures to the production of polyurethane foam moldings having a compact surface.

However, the use of a mixture of incompatible polyols has many disadvantages in terms of storage and processing. Even after brief storage periods (i.e. from a few hours to 3 days) of thoroughly mixed polyol systems, the mixture separates into two phases. Therefore, the polyol mixtures have to be very intensively remixed or continuously mixed or kept in circulation to ensure that the mixing ratio between the components remains intact.

Various methods have been proposed for phase-stabilizing mixtures of this type. U.S. Pat. No. 3,945,939 for example, prevented the phases from separating by adding colloidal silica or a clay modified with an onium compound. Similarly, German Offenlegungsschrift No. 2,341,294 disclosed that the use of inert, surface-active materials having a specific surface of from 10 to 800 $m^2/g$ (such as silica agglomerate and/or a chrysotile asbestos and/or an inorganic material corresponding in its mineral composition to chrysotile asbestos) would reduce separation of the polyols.

Another possible method for homogenizing several incompatible polyols is the use of liquid or soluble solution promoters. According to U.S. Pat. No. 4,141,952, mixtures of monomeric polyols having a molecular weight below 500 and polyether polyols having a molecular weight in the range from 1800 to 7000 are prevented from separating by the use of so-called graft polypropylene ether glycols having a molecular weight in the range from 1500 to 3500. U.S. Pat. No. 4,273,884 discloses that a stable emulsion of a high molecular weight polyol and ethylene glycol or 1,4-butane diol may be produced by using an ethylene oxide/propylene oxide copolymer (molecular weight >12000).

German Offenlegungsschrift No. 2,759,398 describes mixtures of poly(oxypropylene/oxyethylene)-polyols (OH-number 20-60) having certain oxyethylene contents and ethylene glycol or butane diol. The polyols used are required to have a terminal oxyethylene content of from 10 to 30 wt % and an inner oxyethylene content of from 5 to 60 wt %. It is preferred for as much ethylene oxide as possible to be internally incorporated in the polyols.

According to U.S. published application Ser. No. B 471,405, mixtures of high molecular weight polyoxyalkylene polyols having OH-equivalent weights of from 650 to 3000 and, for example, ethylene glycol may be protected against separation by the use of soluble diol compounds, such as 1,2-butylene glycol, di-(1,2-butylene glycol), di-(1,2-propylene glycol) and tri-(1,2-propylene glycol).

Two-phase mixtures of incompatible polyols may also be phase-stabilized by the addition of emulsifiers, such as long-chain benzene alkyl sulfonates.

The prior art does not, however, disclose a fully satisfactory resolution of the separation problem. The use of solids as emulsion stabilizers can give rise to abrasion in mixing units, in addition to which the stabilizing effect generally falls off drastically after a few days. Use of asbestos-containing materials is objectionable on physiological grounds. Another factor which must be taken into account where surface-active materials are used is their natural catalytic activity, particularly when they are charged with onium compounds. Use of so-called "graft polyols", as proposed in U.S. Pat. No. 4,141,852, has the disadvantage that "graft polyols" such as these are expensive compared to polyols and thus adversely affect the economy of the process.

U.S. Pat. No. 4,273,884 discloses "fairly stable" emulsions which show at least some phase separation in the first 6 to 8 weeks.

Although, according to U.S. published application Ser. No. B 471,405, it is possible to produce phase-stable polyol mixtures by using di- and tripropylene glycol, use of these compounds produces a serious deterioration in the mechanical properties (particularly dimensional stability under heat) of polyurethane plastics produced from them.

The use of conventional emulsifiers for phase stabilization involves numerous disadvantages. The emulsifiers can separate in crystalline form from the polyol mixture over a period of time or they may accumulate at the surface. Further, the emulsifiers are capable of uncontrollably upsetting the catalytic balance of the system. Additionally, conventional emulsifiers are capable of exuding from the finished polyurethane molding and, hence, of seriously impairing its service properties.

An urgent commercial need for polyol or polyol-polyamine formulations which have an adequate shelf life (at least about 6 months), which are optically clear and which have a high mixed hydroxyl and, optionally, hydroxyl/amine number and a high content of, preferably, ethylene glycol and/or 1,4-butane diol still exists.

German Offenlegungsschrift No. 3,219,759 describes homogeneously storable mixtures of relatively high molecular weight polyoxyalkylene polyols having an OH number of from 20 to 210 and containing at least 5 wt % of predominantly terminal oxyethylene segments and ethylene-glycol-containing reaction products of ethylene glycol with from 0.1 to 0.5 mole of propylene oxide.

German Offenlegungsschrift No. 3,219,822 describes storable homogeneous polyol mixtures of relatively high molecular weight polyoxyalkylene polyols having an OH-number of from 20 to 210 and at least 5 wt % of predominantly terminal oxyethylene segments in admixture with reaction products of ethylene glycol and/or 1,4-butane diol and from 0.05 to 0.5 mole of alkyloxiranes, the mixture additionally containing ammonium or metal salts of $C_1$–$C_8$-monocarboxylic or polycarboxylic acids or hydrohalic acids as solution-promoting additives in quantities of from 0.01 to 5 wt %, based on the polyoxyalkylene polyols.

Although the polyol formulations disclosed in German Offenlegungsschriften No. 3,219,759 and 3,219,822 represent a significant advance over the prior art, these formulations are disadvantageous in that the short-chain crosslinking component (for example ethylene glycol or 1,4-butane diol) must be partially alkylated with an oxirane in a separate reaction step. It was therefore necessary to use an excess of diol in relation to the alkoxylation product. In addition, particular care had to be taken in the alkoxylation of the diols. It is therefore difficult to add dipropoxylated ethylene glycol to ethylene glycol, for example, to an extent such that the oxypropyl content would be the same as the corresponding mixture of monopropoxylated ethylene glycol with ethylene glycol. In addition, the alkoxylation products of the diols adversely affect many properties of the polyurethane plastic synthesized therewith, so that the polyol miscibility improved by the alkoxylation products is obtained at the expense of the properties of the polyurethane products.

SUMMARY OF THE INVENTION

It is an object of the present invention to provide homogeneous storable mixtures containing small quantities of salts and having a high mixed hydroxyl number or mixed hydroxyl/amine number as well as a high content of low molecular weight compounds containing at least two hydroxyl groups.

It is also an object of the present invention to provide homogeneous storable mixtures in which alkoxylation products of low molecular weight polyols need not be employed to promote stability.

It is another object of the present invention to provide homogeneous storable mixtures which remain homogeneous even when no emulsifier is present.

It is a further object of the present invention to provide homogeneous mixtures having a high mixed hydroxyl number or mixed hydroxyl/amine number which is useful in the production of polyurethanes, particularly by the RIM process.

These and other objects which will be readily apparent to those skilled in the art are accomplished by mixing (a) a polyoxyalkylene polyol and/or polyolamine and/or polyamine based on an alkyloxirane and having a molecular weight of from 400 to 12,000, (b) a polyol containing at least two hydroxyl groups having a molecular weight of from 62 to 399 which polyol does not form a mixture which remains homogeneous with only (a) and (c) a solution-promoting additive. The solution-promoting additive (c) is selected from the salts of cations of the first, second and third Main Groups of the Periodic System of Elements, ammonium and mono- to tetra-alkylammonium ions and anions formed by removing at least one proton from an acid having a $K_s$-value of at least $10^{-7}$. The mixture components are used in quantities such that for every 100 parts by weight of (a), from 1 to 200 parts by weight of (b) and from 0.01 to 10 parts by weight of (c) are present.

DETAILED DESCRIPTION OF THE INVENTION

It has been found that a mixture of relatively high molecular weight oxyalkylene polyols, polyolamines and/or polyamines having a molecular weight in the range from 400 to 12000 with low molecular weight polyols containing at least two hydroxyl groups and having a molecular weight in the range from 62 to 399 (preferably ethylene glycol and/or 1,4-butane diol) and certain salts give homogeneously storable mixtures without using alkoxylation products of these low molecular weight polyols for stabilization.

It has also been found that polyamines which are derived (formally) by partial or complete replacement of the hydroxyl groups of the polyols with primary and/or secondary amino groups or by —O—(CH$_2$)$_3$—NH$_2$-groups or similar terminal groups containing amino groups formed by the terminal group modification of polyoxyalkylene polyols by known methods, or polyolamines in which only some of the OH-groups are replaced by the above-mentioned amino groups or residues containing amino groups, can also be made homogeneously storable and miscible with low molecular weight polyols (such as ethylene glycol and/or 1,4-butane diol) if the appropriate salts are added in the appropriate quantities.

By virtue of their high reactivity and their specific properties, the above-described polyols, polyolamines and polyamines are being used to an increasing extent in polyurethane systems, such as those employed in the reaction injection molding (RIM) process. Mixtures of these polyoxyalkylene polyamines with low molecular weight polyols (such as ethylene glycol) only do not however remain homogeneous. Consequently, formulations such as these were difficult to use for the production of polyurethanes, particularly by the RIM-process. The present invention, however, makes it possible to convert even polyoxyalkylene polyamines and low molecular weight polyols into homogeneous mixtures which are easier to use for the production of polyurethanes, particularly by the RIM-process.

The present invention relates to homogeneously storable, salt-containing, emulsifier-free mixtures having a high mixed hydroxyl number and a high content of low molecular weight polyols (molecular weight 62 to 399). More specifically, these mixtures are made up of relatively high molecular weight polyoxyalkylene polyols, low molecular weight polyols (molecular weight 32 to 399) containing at least two hydroxyl groups and solution-promoting additives based on salts. Other compounds containing isocyanate-reactive hydrogen atoms as well as auxiliaries and additives typically used in the production of polyurethanes may also be included in this mixture. These mixtures have a high mixed hydroxyl number and/or mixed hydroxyl/amine number. The relatively high molecular weight polyoxyalkylene polyols, polyolamines and polyamines have a molecular weight of from 400 to 12,000, preferably from 800 to 10,000 and, most preferably, from 1000 to 8000, are based on alkyloxiranes (preferably, propylene oxide) and preferably contain at least 5 wt % and less than 80 wt % (more preferably, from 10 to 50 wt %) of oxyethylene segments. The polyolamines and polyamines are derived from polyoxyalkylene polyols in which from 0 to 100% of the hydroxyl groups are replaced by primary and/or secondary amino groups or —O(CH$_2$)$_3$.NH$_2$-groups. The low molecular weight compounds (molecular weight 62 to 399) which contain at least two hydroxyl groups, preferably ethylene glycol and/or 1,4-butane diol, are not homogeneously storable to a sufficient extent, if at all, in admixture with only the high molecular weight polyoxyalkylene polyol, polyolamine and/or polyamine. Other di- and/or polyfunctional compounds containing NCO-reactive hydrogen atoms and having a molecular weight of from 32 to 12,000, preferably aromatic polyamines may optionally be included in the mixture. The solution-promoting additives are one or more salts with cations of the 1st, 2nd and 3rd Main Group of the Periodic System of Elements or ammonium or mono- to tetra-alkylammonium ions and with anions which are residues of the type formed by removing at least one proton from an acid having a $K_s$-value of at least $10^{-7}$, preferably anions of mono- or polycarboxylic acids, which may contain additionally OH and/or primary or secondary amino groups, carbonic acid, halogen and pseudohalogen acids and also chalcogenic acids. For every 100 parts by weight of high molecular weight polyoxyalkylene polyol, polyolamine and/or polyamine in the mixture, from 1 to 200 parts by weight of low molecular weight compound containing at least two hydroxyl groups (preferably from 5 to 50 parts by weight and, more preferably, from 10 to 40 parts by weight), from 0 to 40 parts by weight (preferably from 0.1 to 20 parts by weight) of other NCO-reactive compounds and from 0.01 to 10 parts by weight (preferably from 0.1 to 5 parts by weight) of solution-promoting additive are present.

The mixture should not contain any diols having an OH-number of from 1244 to 1806 in admixture with their alkoxylation products with from 0.05 to 0.5 mole of alkyloxiranes in the ratios indicated in U.S. Pat. No. 4,436,841.

Preferred mixtures are those which contain high molecular weight polyoxyalkylene glycols having structures A)-C), which are described hereinafter in more detail, and containing terminal oxyethylene segments in quantities of from 10 to 50 wt % and, more preferably, in quantities of from 12.5 to 27.5 wt % and which have OH-numbers of from 20 to 210. These polyoxyalkylene polyols are also preferably dihydric to tetrahydric polyols with OH-numbers of from 20 to 60.

In another preferred embodiment, the high molecular weight polyoxy-alkylene compounds contain primary (or even secondary) amino groups. If hydroxyl groups and amino groups are both present, it is possible to use a mixture of at least one compound containing hydroxyl groups exclusively and at least one compound almost exclusively containing amino groups. It is particularly preferred to use a compound or a mixture of compounds containing hydroxyl and amino groups or a mixture of the type formed by converting some of the hydroxyl groups of compounds containing hydroxyl groups into amino groups.

The present invention also relates to the use of these homogeneously storable, emulsifier-free, salt-containing mixtures as a reaction component in admixture with polyisocyanates, optionally other NCO-reactive components and, optionally, auxiliaries and additives for the production of polyurethane plastics. Cellular polyurethane plastics with, optionally, an integral density distribution and a compact surface skin are examples of products which may be produced from such mixtures.

The homogeneously storable, emulsifier-free, salt-containing mixtures of the present invention are particularly advantageous in the production of integral skin polyurethane foams. More specifically, the non-cellular skin is thicker, smoother, free from so-called "pin holes" and other surface faults, and in overall terms the integral polyurethane foam moldings show fewer "blowouts", (i.e. irregular craters) than prior art foams. Such integral polyurethane foams, particularly rigid types, may be made by conventional methods using one or more so-called cell stabilizers (e.g., stabilizers based on polysiloxane-polyalkylene oxide copolymers). However, when the polyol mixtures of the present invention are used, there is often little or no need to use such stabilizers.

The mechanical properties of polyurethanes made from the homogeneous polyol formulations of the present invention are also better than those of polyurethanes produced from the known conventional polyol systems. More particularly, the higher initial strength and generally higher initial hardness of polyurethanes made from the mixtures of the present invention result in better mold release. It is believed that the better mechanical properties are attributable to a better polymer structure than is obtained with prior art materials. This better structure is attributed to the fact that the polyol and the crosslinking component react with the isocyanate at substantially the same time, resulting in a more favorable distribution of hard and soft segments, as well as from the fact that it is not essential to incorporate alkoxylation products of low molecular weight diols which impair the thermomechanical properties (mechanical values at elevated temperatures) of the product polyurethane.

It has also been found that, by virtue of the more favorable polymer structure achieved with the mixtures of the present invention, many of the additives which would otherwise be added to standard heterogeneous-multiphase polyol mixtures, develop a more intensive effect or produce the same effect in a smaller quantity when used in the homogeneous polyol mixture of the present invention. This is particularly true with respect to catalysts of a metallic or non-metallic nature, cell stabilizers, hydrophobizing agents, surface-improving agents, internal release agents and agents which improve the separability of the polyurethanes from mold surfaces.

In many cases, the addition of carboxylic acid salts as the solution-promoting additive provides the polyol mixtures of the present invention with catalytic activity of their own which may occasionally be desirable. However, preferred solution-promoting additives are neutral salts, such as alkali salts of hydrohalic acids, for example LiCl, NaCl, KCl, LiBr, NaBr or KBr, but especially KCl. Most of these salts are extremely inexpensive compounds and may be incorporated without significant effort into the low molecular weight component or even into two-phase mixtures of the high molecular weight polyoxyalkylene polyol and low molecular weight polyol.

It has also been found that certain polyether polyols or polyether amines containing oxyethylene groups in conjunction with ethylene glycol or butane diol give a particularly high mixed hydroxyl (amine) number with a relatively high ethylene glycol or 1,4-butane diol content in the mixture without affecting the mixture's phase stability.

The high molecular weight polyols used in the present invention are linear or branched, di-, tri-, tetra- or higher functional polyoxyalkylene polyols (polyalkylene oxide polyols) which have a molecular weight of from 400 to 12,000, preferably from 800 to 10,000 and, more preferably, from 1000 to 8000. These polyoxyalkylene polyols are obtained by the addition of alkyloxiranes, such as propylene oxide, epichlorohydrin, 1,2- or 2,3-butylene oxide and/or styrene oxide, onto difunctional or higher starters, such as water, diols or polyols, ammonia, amines, di- or polyamines, aminoalcohols, hydrazine or similar compounds. Mixtures of alkyloxiranes (for example, of propylene oxide and epichlorohydrin) may also be used for producing the polyoxyalkylene polyols. It is preferred to use polyoxyalkylene polyols which contain at least 5 wt % and less than 80 wt % of polyoxyethylene segments and preferably at least some terminal primary hydroxyl groups. Polyoxyalkylene polyols or oxyethylene copolymers thereof which are based on propylene oxide and, hence, are polyoxypropylene glycols optionally modified with oxyethylene segments are particularly preferred.

The following are particularly preferred:

(A) those polyoxyalkylene polyols which contain predominantly or, more preferably, exclusively terminal oxyethylene blocks in the quantities indicated, preferably in quantities of from 10 to 50% by weight and, more preferably, in quantities of from 12.5 to 27.5% by weight, based on the sum of all the oxyalkylene units present in the polyoxyalkylene polyol. The remaining oxyalkylene radicals preferably consist of oxypropylene-radicals.

The polyoxyalkylene polyols are 2- to 8-functional and preferably di-, tri- or tetrafunctional, particular preference being attributed to the di- to trifunctional polyoxyalkylene polyols having molecular weights in the above-mentioned ranges. Technically the most important polyoxyalkylene polyols are the polyoxypropylene glycols which contain from 5 to 80% by weight, preferably from 10 to 50% by weight and, more preferably, from 12.5 to 27.5% by weight of predominantly or, more preferably, exclusively terminal oxyethylene blocks and which have a functionality of from 2 to 3.

(B) Further preferred polyoxyalkylene polyether polyols, preferably diols or triols are those which contain predominantly or exclusively internal oxyethylene blocks in quantities of 5–80% by weight, preferably 10–50% by weight particularly preferably 15–35% by weight, and which at the same time contain terminal oxyethylene units in quantities of 0–15% by weight, particularly preferably 0–7.5% by weight, and in which the remaining oxyalkylene groups are oxypropylene groups.

A further preferred group of polyoxyalkylene polyether polyols (C) consists of those polyoxyalkylene polyether polyols which contain oxyethylene radicals incorporated in random distribution in the polyoxyalkylene polyols. Here, in addition to the general, above-mentioned ranges, the preferred range is 30–75% by weight, particularly preferably 40–60% by weight of ethylene oxide in addition to oxypropylene groups.

The polyalkylene polyether polyols can also be used in the form of a mixture.

The following limitation applies generally to the three preferred polyether polyols (A)–(C): The content of oxyethylene may only be so high that the liquid polyether polyols are present at room temperature, or that the non-oxyethylene content in the polyether polyol is favourably selected to obtain a liquid polyether polyol.

The polyoxyalkylene polyols may be produced in known manner by the polymerization of alkyloxiranes or mixtures thereof or by their addition onto starter components containing reactive hydrogen (such as water, ethylene glycol, 1,2- or 1,3-propane diol, dipropylene glycol, 1,4-3,6-dianhydrosorbitol, trimethylol propane, glycerol, pentaerythritol, sorbitol, sucrose, 4,4'-dihydroxydiphenyl propane, aniline, ethanolamine or ethylene diamine), optionally in the presence of acidic or, preferably basic catalysts. The polymerization process is optionally carried out in admixture with ethylene oxide, but preferably in stages with addition of the ethylene oxide in the final stage being preferred, or in stepwise reaction, in such a manner that the polyols (A–C) are formed. Some of the oxyethylene sequences or blocks may also be present within the polyethers, although for the most part they should be terminally arranged.

Production, properties and specific examples of polyethers of the type in question are described in Ullmanns Enzyklopadie der Technischen Chemie, Verlag Chemie, Weinheim, 4th Edition, Vol. 19 (1981), in the chapter on polyalkylene glycols (pages 31 to 38) and in the chapter on polyurethanes (pages 301 to 341, more particularly pages 304 to 308). They are also discussed in Kunststoff-Handbuch, Vol. VII, Polyurethane, Carl Hanser Verlag, Munich, 1st Edition (1966), pages 61 to 75, and 2nd Edition (1983), pages 42 to 54 and pages 75 to 77.

In another embodiment of the present invention, up to 100 wt %, preferably from 10 to 50 wt %, of all the hydroxyl groups in the polyoxyalkylene polyol compound(s) may be replaced by primary and/or secondary amino groups and/or by $-O-(CH_2)_3-NH_2$-groups. In this embodiment, it is preferred to use compounds of the type formed by the amination of polyalkylene glycol ethers, as described for example in BE-PS No. 634,741 or U.S. Pat. No. 3,654,370. To achieve the objective of the invention, it is also preferred to use compounds containing hydroxyl groups in polyoxyalkylene polyether polyols amino groups of the type formed by the amination of of the type listed as the preferably usable groups (A)–(C).

Other compounds containing amino groups, preferably in admixture with polyether polyols, suitable to the present invention are those obtained by the addition of acrylonitrile onto polyalkylene ethers, followed by hydrogenation of the cyano groups (German Pat. No. 1,193,671) and which mainly contain $-O-(CH_2)_3NH_2$-groups. Other suitable aminopolyethers may be obtained in accordance with German Offenlegungsschrift No. 2,546,536, U.S. Pat. No. 3,865,791; German Offenlegungsschrift No. 1,694,152 (U.S. Pat. No. 3,625,871), U.S. Pat. Nos. 3,155,728, 3,236,895, French Pat. Nos. 1,551,605, 1,466,708, German Offenlegungsschriften Nos. 2,019,432 and 2,619,840, U.S. Pat. Nos. 3,808,250, 3,975,428, 4,016,143, German Offenlegungsschriften Nos. 2,748,419 and 3,039,600 and European Pat. No. 71,834.

These amino-group-containing polyethers have molecular weights, propylene oxide and ethylene oxide contents and the terminal or non-terminal distribution thereof within the same ranges given above for the high molecular weight polyols (A)–(C).

In cases where compounds containing amino groups are used, it is preferred to use a mixture of the type obtained by the partial amination (preferably 10 to 50%) of the compounds containing primary hydroxyl groups or a mixture of those compounds.

Pure polyoxyethylene polyols are not suitable as the high molecular weight polyoxyalkylene polyol because they are homogeneously miscible with low molecular weight polyols such as ethylene glycol, and are stable in storage, even in the absence of additives.

Pure polyoxypropylene glycols are less preferred as the sole polyethers and, according to the invention, are preferably used in admixture with polyether polyols or polyether polyamines containing oxyethylene groups.

Compounds containing at least two hydroxyl groups and having a molecular weight of from 62 to 399 and preferably from 62 to 254 may be used as the low molecular weight polyols. These polyols would show very little, if any, miscibility in the high molecular weight polyoxyalkylene polyols without the modification with salts according to the invention.

Appropriate low molecular weight polyols, diols or mixtures of diols, preferably straight-chain or branched-chain (cyclo)alkylene diols, such as ethylene glycol, 1,2-propane diol, 1,3-propane diol, 3-chloro-1,2-propane diol, 1,4-butane diol, 1,4-dihydroxy cyclohexane, 1,4-dihydroxy methyl cyclohexane, 2-butene-1,4-diol; (cyclo)aliphatic triols, such as glycerol, trimethylol ethane, 1,2,6-hexane triol, trimethylol propane or 1,2,4-butane triol, and the propoxylation and ethoxylation products of these triols with molecular weights of up to 399; polyols, such as bis- and tris-trimethylol propane, pentaerythritol and their mono- and oligo-ethoxylation products: also the bis-propoxylation or bis-ethoxylation products of aromatic phenols, preferably bis-(4-hydroxyphenyl)-dimethyl methane or hydroquinone. Formoses and formitols having molecular weights of up to 399 are also suitable. Ethylene glycol and/or 1,4-butane diol are preferred. However, ethylene glycol is the most preferred.

Low molecular weight polyols which show high and homogeneous solubility in the high molecular weight polyoxyalkylene polyol (such as di- or tri-propylene glycol) may not be used as the sole low molecular weight polyol in the mixtures of the present invention.

Alkoxylation products of ethylene glycol or 1,4-butane diol described in German Offenlegungsschriften Nos. 3,219,759 and 3,219,822 (U.S. Pat. No. 4,436,841) may not be used in the mixtures of the present invention.

Isocyanate-reactive compounds other than those described above which may optionally be included in the mixtures of the present invention are compounds containing at least two isocyanate-reactive hydrogen atoms and having a molecular weight of from 32 to 12,000. These compounds include both relatively high molecular weight compounds containing amino groups, thiol groups, hydrazide groups or carboxyl groups but preferably hydroxyl groups having a molecular weight of from 400 to 12,000 and preferably from 1000 to 8000 (for example, polyesters, polythioethers, polyacetals, polycarbonates and polyester amides and also polyoxytetramethylene polyols containing at least 2, generally 2 to 8, but preferably 2 to 3 hydroxyl groups) known to be useful in the production of solid and cellular polyurethanes, and also relatively low molecular weight, di- and/or poly-functional compounds having molecular weights of from 32 to 399 (preferably from 62 to 254) and/or water (i.e. the crosslinking agents or chain-extending agents generally known in polyurethane chemistry).

Suitable relatively high molecular weight compounds which may optionally be included in the mixtures of the present invention are, for example, polyesters containing hydroxyl groups, i.e. reaction products of polyhydric, preferably dihydric and, optionally, also trihydric alcohols (or mixtures thereof) with polybasic, preferably dibasic carboxylic acids, carboxylic acid esters or carboxylic acid anhydrides. Polyesters of lactones or hydroxy carboxylic acids, for example caprolactone or ε-hydroxycaproic acid, may also be used. OH-, NH- and/or SH-group-containing polybutadienes, polythioethers, polyacetals, OH-group-containing polycarbonates, polyester amides, polyether polyols substantially free from ethylene oxide and/or propylene oxide units, (for example polytetramethylene oxide diols) and amino-functional polyamides may also be used.

Polyhydroxyl compounds already containing urethane or urea groups and optionally modified natural polyols such as castor oil or carbohydrates such as starch, may also be included. Adducts of alkylene oxides with phenol-formaldehyde resins or even with urea-formaldehyde resins, may also be used. Solutions of polyisocyanate polyaddition products, particularly solutions of polyurethane ureas containing ionic groups and/or solutions of polyhydrazodicarbonamides, in low molecular weight polyhydric alcohols (German Offenlegungsschrift No. 2,638,759) may also be used as optional isocyanate-reactive materials. Polyhydroxyl compounds of the polyamino compounds (polyether amines), in which high molecular weight polyadducts or polycondensates or polymers are present in finely disperse or dissolved form, may also optionally be used.

Polyhydroxy or polyamino compounds such as these are obtained, for example, by carrying out polyaddition reactions (for example reactions between polyisocyanates and aminofunctional compounds) or polycondensation reactions (for example between formaldehyde and phenols and/or amines) in situ in the abovementioned compounds containing hydroxyl groups. Processes such as these are described for example in German Auslegeschriften Nos. 1,168,075 and 1,260,142 and in German Offenlegungsschriften Nos. 2,324,134, 2,423,984, 2,612,385, 2,513,815, 2,550,796, 2,550,797, 2,550,883, 2,550,862, 2,633,293 and 2,639,253. However, it is even possible, in accordance with U.S. Pat. No. 3,869,413 or German Offenlegungsschrift No. 2,550,860, to mix a prepared aqueous polymer dispersion with a polyhydroxyl compound and subsequently to remove the water from the mixture. The production of polymer-containing polyether amines is described in U.S. Pat. No. 4,286,074 and in German Offenlegungsschriften Nos. 3,112,118 and 3,200,021.

Polyhydroxyl compounds modified by vinyl polymers, obtained for example by polymerizing styrene and acrylonitrile in the presence of polyethers (U.S. Pat. Nos. 3,383,351; 3,304,273; 3,523,093 and 3,110,695; German Auslegeschrift No. 1,152,536) or polycarbonate polyols (DE-C No. 1,769,795; U.S. Pat. No. 3,637,909), may also be used as an optional component in the mixtures of the present invention. Polyether polyols which have been modified in accordance with German Offenlegungsschriften Nos. 2,442,101, 2,644,922 and 2,646,141 by graft polymerization with vinyl phosphonic acid esters and, optionally, (meth)acrylonitrile, (meth)acrylamide or OH-functional (meth)acrylic acid esters are particularly useful in the production of flame resistant plastics.

Modified polyhydroxyl compounds of the type mentioned above may be used as a starting component in the polyisocyanate polyaddition process to produce polyurethanes having considerably improved mechanical properties.

Relatively high molecular weight, di- or polyfunctional polyamino compounds may also be used advantageously as an optional isocyanate-reactive component in the mixtures of the present invention. The reaction of NCO-prepolymers with enamines, aldimines or ketimines containing hydroxyl groups, followed by hydrolysis, in accordance with German Offenlegungsschrift No. 2,546,536 or U.S. Pat. No. 3,865,791, gives relatively high molecular weight compounds containing terminal amino groups. Other processes for producing relatively high molecular weight compounds containing terminal amino groups or hydrazine groups are described in German Offenlegungsschrift No. 1,694,152 (U.S. Pat. No. 3,625,871). In these compounds, the terminal residues containing the amino groups may even be attached to the polyether chain through urethane or ester groups. "Aminopolyethers" may also be produced by reacting polyhydroxyl polyethers of relatively high molecular weight with isatoic acid anhydride to form the corresponding anthranilic acid esters and polyethers containing terminal aromatic amino groups. Other amino polyethers having molecular weights of from 400 to 12,000 obtainable for example in accordance with German Offenlegungsschriften Nos. 2,948,419 and 3,039,600 and European Patent Application No. 71,834, particularly amino polyethers obtainable by alkaline NCO-hydrolysis may also be used as an optional isocyanate-reactive component of the mixtures of the present invention.

Other suitable optional isocyanate-reactive components are relatively low molecular weight compounds containing at least two isocyanate-reactive hydrogen atoms and having a molecular weight of from 32 to 399 and/or water. These compounds contain hydroxyl groups and/or amino groups and/or thiol groups and/or carboxyl groups and/or —$CH_2$—$NH_2$—$NH_2$-groups and preferably contain hydroxyl groups and/or (aromatic) amino groups of the type known as chain-extending agents or crosslinking agents for polyurethanes. These compounds generally contain from 2 to 8 and preferably from 2 to 4 reactive, especially isocyanate-reactive, hydrogen atoms. These low molecular weight compounds may even be used in the form of mixtures or in admixture with the optional relatively high molecular weight compounds.

Examples of these low molecular weight compounds are diols or polyols such as ethylene glycol; 1,2- and 1,3-propane diol; 1,4-, 1,3- and 2,3-butane diol; 1,5-pentane diol; 1,6-hexane diol; 1,8-octane diol; neopentyl glycol; 1,4-bis-hydroxymethyl cyclohexane; 2-methyl-1,3-propane diol; dibromobutene diol; glycerol; trimethylol propane; 1,2,6-hexane triol; trimethylol ethane; pentaerythritol; quinitol; mannitol; sorbitol; castor oil; diethylene glycol; triethylene glycol; tetraethylene glycol; higher polyethylene glycols having a molecular weight of up to 399; dibutylene glycol and higher polybutylene glycols having a molecular weight of up to 399; 4,4'-dihydroxydiphenyl propane; dihydroxyethyl hydroquinone; dihydroxyethyl resorcinol; dianhydrosorbitol and formitols; terephthalic acid-bis-(hydroxyethyl)-ester; 1,6-hexamethylene-bis-($\beta$-hydroxyethylurethane); 4,4'-diphenylmethanebis-($\beta$-hydroxyethylurea).

For certain applications, it is of advantage to use polyols containing sulfonate and/or phosphonate groups, preferably the adduct of bisulfite with 1,4-butene diol or alkoxylation products thereof.

Optional isocyanate-reactive components may be selected from low molecular weight aliphatic polyamines such as ethylene diamine, 1,4-tetramethylene diamine, 1,11-undecamethylene diamine, 1,12-dodecamethylene diamine and mixtures thereof; 1-amino-3,3,5-trimethyl-5-aminomethyl cyclohexane ("isophorone diamine"); 2,4- and 2,6-hexahydrotolylene diamine and mixtures thereof; perhydro-2,4'- and -4,4'-diaminodiphenyl methane; p-xylylene diamine; bis-(3-aminopropyl)-methylamine; diaminoperhydroanthracenes and cycloaliphatic triamines (German Offenlegungsschrift No. 2,614,244). In accordance with the present invention, it is also possible to use hydrazine and substituted hydrazines such as methyl hydrazine, N,N'-dimethyl hydrazine and homologs thereof; acid dihydrazides, for example, carbodihydrazide, oxalic acid dihydrazide, the dihydrazides of malonic acid, succinic acid, glutaric acid, adipic acid, $\beta$-methyl adipic acid, sebacic acid, hydracrylic acid and terephthalic acid; semicarbazido-alkylene hydrazides such as $\beta$-semicarbazido-propionic acid hydrazide; semicarbazido-alkylene carbazinic esters such as 2-semicarbazidoethyl-carbazinic ester or even amino-semicarbazide compounds, such as $\beta$-amino-ethyl-semicarbazido-carbonate. To control their reactivity, the amino groups may be completely or partly blocked by aldimine or ketimine groups.

Examples of aromatic diamines preferably used are bis-anthranilic acid esters (German Offenlegungsschriften Nos. 2,040,644 and 2,160,590); 3,5- and 2,4-diaminobenzoic acid esters (German Offenlegungsschriften No. 2,025,900); the diamines containing ester groups described in German Offenlegungsschriften No. 1,803,635 (U.S. Pat. Nos. 3,681,290 and 3,736,350), 2,040,650 and 2,160,589; the diamines containing ether groups (German Offenlegungsschriften Nos. 1,770,525 and 1,809,172; U.S. Pat. Nos. 3,654,364 and 3,736,295); 2-halogen-1,3-phenylene diamines optionally substituted in the 5-position; 3,3'-dichloro-4,4'-diaminodiphenylmethane; tolylene diamine, 4,4'-diaminodiphenylmethane; 4,4'-diaminodiphenylsulfides; diaminodiphenyldisulfides; aromatic diamines substituted by alkylthio groups; diaminobenzene phosphoric acid esters and the alkyl-substituted tolylene diamines (for example, 2,4-/2,6-diamino-3,5-diethyltoluenes); diaminotriethyl benzenes and amines according to European Patent Applications Nos. 82,258 and 69,286. It is preferred to use aromatic diamines such as 2,4-/2,6-diamino-3,5-diethyltoluenes in the mixtures of the present invention because they yield polyurethane moldings with particularly favorable properties.

As is standard practice in polyurethane chemistry, isocyanate monofunctional compounds may be used in small, modifying quantities of from about 0.01 to 3 wt % based on polyurethane solids, as so-called chain terminators in the formation of the polyurethanes.

Representatives of the above-mentioned compounds suitable for use as optional isocyanate-reactive components are described, for example, in High Polymers, Vol. XVI, "Polyurethanes, Chemistry and Technology" by Saunders-Frisch, Interscience Publishers, New York/London, Vol. I, 1962, pages 32–42 and pages 44–54 and Vol. II, 1964, pages 5–6 and 198–199, and in Kunststoff-Handbuch, Vol. VII, Vieweg-Hochtlen, CarlHanser-Verlag, Munich, 1966, for example on pages 45 to 71.

It is of course possible to use mixtures of the above-mentioned compounds containing at least two isocyanate-reactive hydrogen atoms, for example mixtures of polyethers and polyesters, or mixtures of polyesters and low molecular weight polyols.

The solubility-promoting component used in accordance with the present invention is selected from salts which contain cations from the 1st, 2nd and 3rd Main Group of the Periodic System, ammonium and mono- to tetra-alkyl ammonium ions and which contain as anions residues of the type formed by the removal of at least one proton from an acid having a dissociation constant of at least $10^{-7}$ such as mono- or polycarboxylic acids, which may contain additionally one or more OH- and/or primary and/or secondary amino groups and/or mercapto groups, carbonic acid, hydrohalic or pseudohydrohalic acids, acids containing nitrogen, phosphorus, arsenic or antimony as the central atom and also the chalcogenic carbonic acid, hydrohalic or pseudohydrohalic acids, acids containing nitrogen, phosphorus, arsenic or antimony as the central atom and also the chalcogenic acids. Acids such as these include mono- or polycarboxylic acids containing from 1 to 8 carbon atoms, such as aliphatic mono- to tricarboxylic acids like formic acid, acetic acid, propionic acid, butyric acid, n-octanoic acid, 2-ethylhexanoic acid, glutaric acid, adipic acid, nitrilo-triacetic acid, N,N'-dimethyl ethylene diamine diacetic acid or semiesters or semiamides of these di- and tri-carboxylic acids.

Mono- or polycarboxylic acids, mono- or polysulphonic acids or other sulphur-containing acids, mono- or polyphosphoric acids or other mono- or polyacids containing phosphorus, arsenic or antimony etc., which acids contain at least one, preferably 1–3 hydroxyl and/or mercapto and/or amino groups; examples of such acids are glycine, methylclycine, alanine, thioglycolic acid, hydroxyacetic acid, lactic acid, malic acid, tartanic acid, mandelic acid, dimethylolpropionic acid, ascorbic acid, the acids formed by the addition of bisulphites on to, for example, 1,4-butenediol, followed by neutralisation (DE No. 246,440), hydroxymethanesulphonic and -sulphinic acid, citric acid, 2-hydroxyethanesulphonic acid, nitrilo-triacetic acid, ethylenediamino-N,N, N',N'-tetraacetic acid, lysine, aspartic acid, 2-aminoethanesulphonic acid, diaminoethanesulphuric acid, 2-methylaminoethanesulphonic acid, 2-butylaminoethanesulphonic acid, 2-phosphonobutane-1,2,4-tricarboxylic acid, salicylic acid, vanillic acid, $\alpha$- and $\beta$-resorcylic acid, gallic acid, phenol-2-sulphonic acid, 2-hydroxy-5-(2-nitro-4-sulphophenylsulphonyl)benzoic acid, 1-naphthol-4,8-disulphonic acid, sulphosalicylic acid, anilinoacetic acid, anthranilic acid, aminocinnamic acid, metanilic acid, sulphanilio acid, p-phenylenediamino-2-sulphonic acid, as well as phenols such as phenol, nitrophenol, bisphenol A etc. may be used to produce the solution-promoting salts of the present invention. Further examples are the salts of hydrochloric acid, hydrobromic acid, hydroiodic acid, thiocyanic acid, hydrocyanic acid or hydroisocyanic acid, sulfuric acid or other acids of sulfur, for example thiosulfuric acid; nitric acid or phosphoric acid.

Preferred cations are those emanating from the 1st Main Group, such as $Li^{\oplus}$, $Na^{\oplus}$, $K^{\oplus}$; in addition to $Na^{\oplus}$, the potassium cation is particularly preferred.

Preferred anions are the anions of aliphatic $C_1$–$C_4$-monocarboxylic acids or those of hydrohalic or pseudohydrohalic acids, thiosulfuric acid, nitric acid, phosphoric acid, 2,2-dimethylolpropionic acid and optionally mono- to tetra-alkoxylation products of the neutralised adducts of 1,4-butenediol with sodium or potassium bisulphite, the anions being incorporated into the polyurethane matrix via the isocyanates; of the anions, those residues which do not contain any other removable acidic protons are preferred. Particularly preferred salts are potassium acetate and especially potassium chloride which is inert to the NCO-reactions and which shows surprisingly high activity as a solution promoter.

The salts are generally used in a quantity such that there are from 0.01 to 10 parts of salt, preferably from 0.1 to 5 parts and, more preferably, from 0.15 to 2.5 parts of salt to 100 parts of high molecular weight polyoxyalkylene polyol. Where the salts used show relatively difficult solubility (i.e. where less than 10 parts of salt dissolve in the low molecular weight polyol), the quantity dissolved corresponds to the maximum solubility of the particular salt.

The necessary quantity of solution-promoting additive depends upon the quantity of oxyethylene groups in the polyether and also upon the type and quantity of diols added. In general, the lower the oxyethylene content and the higher the content of added diols, the more solution-promoting additive will be required.

In general, the solution-promoting additive is dissolved in the low molecular weight polyol component optionally with heating. The resulting solution is then combined with the high molecular weight polyoxyalkylene component and with other optional components. Since homogeneously stable, optically clear polyol mixtures are the object of the present invention, the solution-promoting additive must show sufficiently high solubility even in admixture with the high molecular weight polyoxyalkylene component. It is also possible to add solid, solution-promoting additive optionally with stirring, to a two-phase mixture of the high and low molecular weight components of the mixtures of the present invention. A concentrated solution of solution-promoting additive in low molecular weight polyol may also be added to a two-phase mixture of the high and low molecular weight components.

The expression "optically clear" applies to the mixture of polyoxyalkylene and low molecular weight polyol components, provided the starting compounds are optically clear. Clouding can of course be produced by insoluble or substantially insoluble optional components. Inclusion of optional components should not however affect the homogeneity of the mixture of the polyoxyalkylene and low molecular weight polyol components.

The salts used as solution-promoting additives are added to the polyoxyalkylene polyols or polyamines and to the low molecular weight polyols particularly when the low molecular weight polyol is immiscible with the polyoxyalkylene polyol and/or polyamine or when the selected quantity of low molecular weight polyol is not completely miscible with the polyoxyalkylene polyol and/or polyamine. The effect which these salts are capable of producing as solubility promoters between polyols-polyamines and the low molecular weight polyols (preferably ethylene glycol or 1,4-butane diol) in a low concentration is new. In particular, the effect whereby a salt, such as potassium chloride, enables large quantities of ethylene glycol to be homogeneously dissolved in the polyoxyalkylene polyols is not apparent from the published prior art and is in fact surprising, because until now it had been considered necessary to add solubility promoters, such as alkoxylated polyols.

Among the standard auxiliaries and additives which may be included in the mixtures of the present invention are known catalysts such as tertiary amines (e.g. dimethyl benzylamine, 1,4-diazabicyclo-(2,2,2)octane or triethanolamine), monocyclic or bicyclic amidines, bis-dialkylaminoalkyl ethers or tertiary amines containing amide groups. Basic catalysts, such as alkali hydroxides, alkali phenolates or alkali alcoholates, and organometallic compounds, particularly organic lead and tin compounds, (for example tin-(II) octoate, tin-(II) laurate, dibutyl tin dilaurate) or mixtures thereof, may also be used.

It is also possible to add known reaction retarders for the isocyanate reaction (for example, substances showing an acidic reaction, such as hydrochloric acid or organic acid halides, boric acid or sulfur dioxide), known cell regulators for foams, such as paraffins or fatty alcohols, or even dimethyl polysiloxanes as well as known pigments, dyes, flameproofing agents, stabilizers against the effects of light, aging and weather, plasticizers and fungistatic and bacteriostatic agents. Additional examples of such optional additives are described in Kunststoff-Handbuch, Vol. 7, by Vieweg and Hochtlen, Carl-Hanser-Verlag, Munich, 1966, on pages 96 to 113, blowing agents for the production of polyurethane foams being described on pages 453 to 455 and 507 to 510 and also in the 2nd Edition of this handbook, Vol. 7 (1983), pages 92 to 112.

In principle, it is possible to use any conventional release agents in the production of polyurethanes, particularly integral foams with the polyol mixtures of the present invention. It is preferred to use internal mold release agents of the type described, for example, in German Offenlegungsschriften Nos. 1,953,637 (U.S. Pat. No. 3,726,952), 2,121,670 (British Pat. No. 1,365,215), 2,431,968 (U.S. Pat. No. 4,098,731) and 2,404,310 (U.S. Pat. No. 4,058,492). Accordingly, appropriate release agents include salts of fatty acids containing at least 25 aliphatic carbon atoms, preferably at least 12 aliphatic carbon atoms and primary mono-, di- or polyamines containing two or more carbon atoms or amide or esteramines containing at least one primary, secondary or tertiary amino group, saturated and/or unsaturated COOH- and/or OH-group-containing esters of monobasic and/or polybasic carboxylic acids and polyfunctional alcohols having hydroxyl or acid numbers of at least 5, ester-like reaction products of ricinoleic acid and long-chain fatty acids, salts of carboxylic acids and tertiary amines and also natural and/or synthetic oils, fats or waxes. The oleic acid or tall oil fatty acid salt of the amidoamine obtained by reacting N-dimethylaminopropylamine with oleic acid or tall oil fatty acid is particularly preferred.

In addition to the above-described release agents, it is also possible in principle to use other state-of-the-art release agents either individually or in admixture with the release agents described above in the production of polyisocyanate addition products from the mixtures of the present invention. These other, suitable release agents include, for example, the reaction products of fatty acid esters and polyisocyanates (German Offenlegungsschrift No. 2,319,648), the reaction products of polysiloxanes containing reactive hydrogen atoms with mono- and/or polyisocyanates (German Offenlegungsschrift 2,356,692 (U.S. Pat. No. 4,033,912)), esters of polysiloxanes containing hydroxymethyl groups with mono- and/or polycarboxylic acids (German Offenlegungsschrift No. 2,363,452 (U.S. Pat. No. 4,024,090)), salts of aminopolysiloxanes and fatty acids (German Offenlegungsschriften Nos. 2,427,273 and 2,431,968 (U.S. Pat. No. 4,098,731)), hydroxylsubstituted fatty acid amides (U.S. Pat. No. 4,374,222) or release agents according to U.S. Pat. No. 4,111,861 such as mixtures of aromatic or aliphatic carboxylic acids with a polar metal compound.

The internal mold release agents mentioned above are used, if at all, in a total quantity of from 0.1 to 25 wt % and preferably in a total quantity of from 1 to 10 wt %, based on the reaction mixture as a whole.

Isocyanate-inert polymers or copolymers of olefinically unsaturated monomers having a molecular weight determinable by vapor pressure osmometry of from 200 to 50,000, preferably from 200 to 30,000 and, more preferably, from 5000 to 15,000 (German Offenlegungsschrift No. 3,231,399) compatible with the reaction mixture may be used as surface-improving additives. The polymers or copolymers generally have a viscosity of from 1 to 1000 Pa.s at 100° C. The polymers or copolymers are preferably those in which from 50 to 100 parts by weight are at least one $C_1$-$C_{18}$-alkyl ester, preferably $C_1$-$C_{10}$-alkyl ester, of acrylic or methacrylic acid and from 0 to 50 parts by weight are other isocyanate-inert, olefinically unsaturated monomers. In principle, it is also possible to use polymers completely or partly free from acrylates or methacrylates, such as polystyrenes or styrene copolymers.

Other suitable surface-improving additives are metal salts of a monocarboxylic acid containing from 10 to 35 carbon atoms. The carboxylic acids are, preferably, optionally olefinically unsaturated, aliphatic or cycloaliphatic carboxylic acids such as dodecane carboxylic acid, stearic acid, oleic acid, linoleic acid, linolenic acid, tall oil acid, arachidonic acid, myristic acid, dimeric fatty acid, palmitic acid, margaric acid, arachic acid, cerotic acid, melissic acid, erucic acid, abietic acid or naphthenic acids. The metals on which the salts are based are preferably metals of the 1st to 3rd Main Group or 2nd Secondary Group of the Periodic System of Elements. Such salts include salts of the alkali metals, particularly sodium or potassium salts of the alkaline earth metals, particularly magnesium or calcium, salts of aluminum or salts zinc and acids preferably containing $\geq 10$ carbon atoms. The zinc salts are particularly preferred. These metal salts do not have the homogenizing effect of the solution-promoting additives required in the present invention.

The polyol mixture of the present invention may be used as the sole reaction component containing OH groups or in combination with other OH group containing materials together with polyisocyanates, the optional isocyanate-reactive compounds and other optional auxiliaries and additives, such as blowing agents, cell regulators, catalysts, colorants, fillers and/or fibers to produce polyurethanes.

In addition to the polyol mixture of the present invention, other relatively high molecular weight polyols having molecular weights of, for example, from 400 to 12,000 and preferably from 450 to 6000 in the form of the polyesters, polylactones, polycarbonates, polyoxytetramethylene ethers, polythioethers, polyesters, polyacetals and vinyl polymers containing preferably 2 or even more active hydrogen atoms (essentially hydroxyl groups) known to those skilled in the art of polyurethane chemistry may be used to produce polyurethanes. Specific examples of such materials are OH-functional polybutadiene oils, polyacrylates containing hydroxyl groups, polyhydroxyl compounds already containing urethane or urea groups and optionally modified natural polyols or even other compounds containing Zerewitinoff-active groups, such as amino, $CONHNH_2$-, carboxyl- or thiol groups. These compounds are known to those in the art and are described, for example, in German Offenlegungsschriften Nos.

2,302,564; 2,423,764; 2,549,372 (U.S. Pat. No. 3,963,679); 2,402,799: 2,431,849; 2,402,840 (U.S. Pat. No. 3,984,607); 2,457,387 (U.S. Pat. No. 4,035,213) and, more particularly, 2,854,384. These compounds have also been described previously as isocyanate-reactive compounds which may optionally be included in the mixtures of the present invention.

Chain-extending agents or polyfunctional compounds (crosslinking agents) having molecular weights of from about 18 to 399, preferably from 32 to 399 and, more preferably, from 62 to 254, which may optionally be used in accordance with the invention, include compounds containing H-active groups, such as water, hydrazine (hydrate), glycols, polyamines, dihydrazide compounds, aminoalcohols, etc. commonly used for polyurethane syntheses. A detailed list of suitable compounds can be found in German Offenlegungsschrift No. 2,854,384.

Suitable polyisocyanates are those polyisocyanates commonly used for the production of polyurethanes, for example aliphatic, cycloaliphatic, araliphatic, aromatic and heterocyclic polyisocyanates, preferably diisocyanates described, for example, by W. Siefken in Justus Liebigs Annalen der Chemie, 562, pages 75 to 136 (for example, hexane-1,6-diisocyanate, 1-isocyanato-3,3,5-trimethyl-5-isocyanatomethyl cyclohexane, dicyclo-hexylmethane-2,4'- and/or -4,4'-diisocyanate, 1,3- and/or 1,4-cyclohexane diisocyanate, optionally in any mixtures of all possible stereoisomers).

Particularly suitable polyisocyanates are the aromatic polyisocyanates, such as tolylene-2,4- and/or -2,6-diisocyanate (TDI); diphenylmethane-4,4'- and/or -2,4'- and/or -2,2'-diisocyanate (MDI); and the technical polyphenyl-polymethylene polyisocyanates obtained by phosgenating aniline-formaldehyde condensates and described, for example, in British Pat. Nos. 874,430 and 848,671 (MDI containing polynuclear polyisocyanates). The modified polyisocyanates obtained by the modification of TDI and MDI, for example polyisocyanates modified with polyols through urethane groups, carbodiimide polyisocyanates, isocyanurate polyisocyanates, biuretized polyisocyanates, allophanitized polyisocyanates or uretdione polyisocyanates, are examples of modified technical isocyanates.

Other suitable technical polyisocyanates are described in detail in German Offenlegungsschrift No. 2,854,384, in Kunststoff-Handbuch as cited in the foregoing and in Ullmanns Enzyklopadie, 4th Edition, Vol. 19, pages 303 to 304.

The polyisocyanates may also be used in the form of NCO-prepolymers of the starting polyisocyanates and, for example, relatively high molecular weight polyols.

Auxiliaries and additives may be introduced either separately or in admixture with one of the reaction components, such as (additional) relatively high molecular weight polyhydroxyl compounds, polyisocyanates or NCO-prepolymers, blowing agents, solvents and the like. Such auxiliaries and additives are, for example, catalysts, reaction retarders, blowing agents, cell regulators, emulsifiers, polysiloxanes, fillers, dyes, pigments, oxidation inhibitors, UV-absorbers, light stabilizers, stabilizers against oxides of nitrogen, flameproofing agents, hydrolysis stabilizers and, optionally, small quantities of monofunctional chain terminators.

The processing of the mixtures of the present invention together with the other polyurethane-forming reactants may be carried out by any of the processes known to those skilled in the art. For example, multistage processes (NCO-prepolymer formation and subsequent reaction) or one-shot processes may be used. Processing is mainly carried out by means of metering, mixing and/or discharge units or in molds of the type normally used for processing polyurethanes (see for example Ullmanns Enzyklopadie der Technischen Chemie, Verlag Chemie Weinheim, 4th Edition, Vol. 19, Keyword "Polyurethanes", pages 314 to 336, and in Kunststoff-Handbuch, Vol. 7, "Polyurethane", Hanser-Verlag, 2nd Edition, 1983; more particularly in Chapter 4 (Processes for Producing Polyurethanes, pages 121 to 169); Chapter 5 (Flexible PUR Foams, pages 170 to 245); Chapter 6 (Rigid PUR Foams, pages 246 to 332) and Chapter 7 (Integral PUR Foams, pages 333 to 390)).

The homogeneous mixture of the present invention may be continuously introduced into a mixing chamber or a mixing vessel in which the other polyurethane-forming components (for example other compounds containing reactive H-atoms, optionally in admixture with additives or auxiliaries) are mixed in through separate metering units. The polyisocyanates (or NCO prepolymers) are generally added through separate pipes. The technical procedure of metering, mixing, simultaneous or step-by-step introduction of components may be modified in various ways in accordance with techniques and procedures known to those in the art. The introduction of the homogeneous mixture of the present invention produces a more uniform reaction and, in general, formation of polyurethane (urea)s having better properties than those obtained with non-homgeneous mixtures.

In one embodiment of the present invention, different mixtures may be combined to form the mixtures of the present invention. More specifically, a mixture of polyoxyalkylene polyol and/or polyamine, low molecular weight polyol and solution-promoting additive having a high concentration of low molecular weight polyol and/or solution-promoting additive may be added to another mixture having a high polyoxyalkylene polyol and/or polyamine and mixed to provide a final mixture which satisfies the composition requirements of the present invention.

The mixtures of the present invention may be used for the production of PU-elastomers in cellular or non-cellular form (preferably with gross densities of from 300 to 1200 kg/m$^3$), thermoplastic PU-elastomers, cast elastomers, flexible, semiflexible or rigid foams such as block foams and molded foams which may vary widely in density (for example, from 20 to 400 kg/m$^3$) and may have closed and/or open cells.

The mixtures of this invention are particularly suitable for the production of moldings having a compact skin and an inwardly increasing cellular core by the RIM process for the production of so-called integral foams. Moldings which change from a cellular integral-foam character to virtually solid polyurethane moldings, for example moldings having densities in the range from 600 to approximately 1400 kg/m$^3$ (of the type marketed as Bayflex ® polyurethane moldings by BAYER AG, D 5090, Leverkusen) may also be produced from the mixtures of the present invention. These applications and the production of optionally cellular polyurethane elastomers are particularly preferred.

The quantities of the optionally foamable polyurethane-forming mixture introduced into the molds are gauged in such a way that the moldings have a density of from 100 to 1400 kg/m$^3$ and preferably from 200 to 1300 kg/m$^3$. Moldings having a density of more than 1200 kg/m³ can be obtained where mineral fillers are also used. The moldings may often be removed from the molds after a residence time of only 5 to 90 seconds (preferably from 20 to 60 seconds).

A temperature in the range from 10° C. to 60° C. and preferably in the range from 20° C. to 50° C. is generally the temperature at which the polyurethane-forming mixture is introduced into the mold. The temperature of the mold is generally in the range from 40° C. to 100° C. and preferably in the range from 50° C. to 70° C.

The preferably cellular moldings having integral density distribution obtained by using the mixtures of the present invention are distinguished by an improved, i.e. more homogeneous, surface. These moldings are particularly suitable for the production of flexible automobile fenders and bodywork components and for the interior trim of automobiles, such as consoles, side panels and dashboards, and also for the production of bicycle or motorcycle saddles. By varying the starting components, it is also possible, for example, to obtain flexible shoe soles showing good abrasion behavior and outstanding mechanical strength.

The mixtures of the present invention may also be used for the production of coating compositions, elasthane filaments or lacquers, dispersions and, generally, as OH-reactive components. Where the components are essentially bifunctional, it is also possible to synthesize linear, soluble polyurethanes.

In the following Examples, all the percentages quoted represent percentages by weight and all the figures in parts are parts by weight.

EXAMPLES

EXAMPLE 1 (Comparison Example)

Ethylene glycol was added to a trifunctional polyether obtained by adding first 78% of propylene oxide and then 22% of ethylene oxide onto trimethylol propane (OH number 27), in a ratio by weight of 15 parts of ethylene glycol to 100 parts of the polyether. A clouded mixture was obtained which, after a few days, separated into its constituent phases.

EXAMPLE 2

This Example illustrates the behavior of mixtures of the polyether of Example 1 and ethylene glycol solutions (4.86% solution of KCl in ethylene glycol) described in detail in Table 1.

EXAMPLE 3

3.1 95 parts of the polyether of Example 1 were mixed with 23.5 parts of ethylene glycol. The mixture was cloudy and, after a few days, separated into two phases (polyol 3.1.) (comparison). 3.2 95 parts of the polyether of Example 1 were mixed with 23.5 parts of a 1.1% by weight solution of KCl in ethylene glycol. The resulting solution was clear and remained phase-stable for months. No KCl crystallized out (polyol 3.2.).

EXAMPLE 4

In this Example, the mechanical properties obtained with homogeneous polyol/crosslinker mixtures (Formulation A) were compared with those of inhomogeneous (two-phase) polyol/crosslinker mixtures (Formulation B).

| Formulation: | | |
|---|---|---|
| A | B | |
| 95 | 95 | parts of the polyol of Example 1 |
| — | 23.5 | parts of ethylene glycol |
| 23.5 | — | parts of 2% ethylene glycol/KCl solution |
| 15 | 15 | parts of dichloromethane |
| 0.15 | 0.15 | parts of dimethyl tin dilaurate |
| 0.1 | 0.1 | part of diazatricyclooctane |

235 parts of polyol component were foamed with 267 parts of a polyisocyanate which had an NCO-content of 24.5% and which had been obtained by reacting a mixture of (a) 90 parts of 4,4'-diphenylmethane diisocyanate containing 5–10% of 2,4'-isomer, and (b) 10 parts of oligomeric polyphenyl-polymethylene polyisocyanate with dipropylene glycol.

Foaming was carried out by thoroughly mixing the components at 25° C. using a standard, commercially available piston metering unit equipped with a positively controlled mixing head (a Rimdomat ® piston metering unit equipped with a plunger-cleaned throttle slide mixing head MQ of the type manufactured by the Hennecke Company of St. Augustin) and introducing the reaction mixture thus formed into a 20×20×1 cm steel mold heated to 60° C. of which the inner walls had been sprayed with a commercially available wax-based mold release agent (a solution in dichloromethane of "Phonixwachs", a product of the Acmos Company). After 2 minutes, the molding was removed from the mold. The mechanical data of the molding obtained are shown in the following Table.

| Properties | A | B |
|---|---|---|
| Unit weight (kg/m3) (DIN 53 420) | 1050 | 1043 |
| Shore-D hardness (DIN 53 505) | 65 | 67 |

TABLE 1

| Example No. | Polyether, quantity | Ethylene glycol/ KCl mixture (4.86%) | Ethylene glycol | % KCl (based on PE/EG-mixtures) | Phases |
|---|---|---|---|---|---|
| 2.1 | 100 parts | -(comparison) | 5 parts | — | 1 |
| 2.2 | 100 parts | 15 parts | — | 0.44 | 1 |
| 2.3 | 100 parts | 20 parts | — | 0.81 | 1 |
| 2.4 | 100 parts | 30 parts | — | 1.12 | 1 |
| 2.5 | 100 parts | 50 parts | — | 1.62 | 1 |
| 2.6 | 100 parts | 100 parts | — | 2.34 | 1 |
| 2.7 | 100 parts | 100 parts | 100 parts | 1.56 | 1 |

In tests 2.4, 2.5 and 2.6, mixing was accompanied by a drastic increase in viscosity.
PE = polyether
EG = ethylene glycol -continued

| Properties | A | B |
|---|---|---|
| E-modulus in flexure (MPa) (ASTM-D 790) | 528 | 608 |
| Tensile strength (MPa) (DIN 53 504) | 27 | 29 |
| Tear propagation resistance (kN/m) (DIN 53 515) | 85 | 87 |
| Breaking elongation (%) (DIN 53 504) | 200 | 200 |
| Sag value [120° C., 30] (mins.) | 7.5 | 9 |
| HDT-value (according to ISO R 75, B-test) | 75 | 73 |

EXAMPLE 5

In this Example, different polyether polyols were used for homogenization. The ethylene glycol/potassium chloride solution used was a 5% solution. The results are given in Table 2.

TABLE 2

| 100 parts of polyol | EG/KCl-mixture | EG | % KCl in the mixture | Phases |
|---|---|---|---|---|
| 5.1 polyol A | 10–40 parts | — | 0.45–0.36 | 1 |
| 5.2 polyol B | 10 parts | — | 0.45 | 1 |
| 5.3 polyol C | 10 parts | — | 0.45 | 1 |
| 5.4 polyol D | 10 parts | — | 0.45 | 1 |
| 5.5 polyol E | 10 parts | — | 0.45 | 1 |
| 5.6 polyol F | 10 parts | — | 0.45 | 1 |
| 5.7 polyols A to E | 10 parts of each | | | 2 (comparison tests) |

Polyol A

A trifunctional, trimethylol-propane-started polyether triol (OH number 28) of 83% of propylene oxide and 17% of ethylene oxide (terminal).

Polyol B

A trifunctional, trimethylol-propane-started polyether triol (OH number 35) of 86.5% of propylene oxide and 13.5% of ethylene oxide (terminal).

Polyol C

A difunctional, propylene-glycol-started polyether diol (OH number 28) of 85% of propylene oxide and 15% of ethylene oxide (terminal).

Polyol D

A difunctional, propylene-glycol-started polyether diol (OH number 28) of 80% of propylene oxide and 20% of ethylene oxide (terminal).

Polyol E

A difunctional, propylene-glycol-started polyether diol (OH number 56) of 80% of propylene oxide and 20% of ethylene oxide (terminal).

Polyol F

A trifunctional, trimethylol-propane-started polyether triol (OH number 27) of 78% of propylene oxide and 22% of ethylene oxide (terminal).

EXAMPLE 6

In this Example, an aromatic diamine (a mixture of 65 parts of 2,4- and 35 parts of 2,6-diamino-3,5-diethyl toluene) was used as an additional isocyanatereactive component. The results are given in Table 3.

TABLE 3

| Test No. | Polyol | EG/KCl 5% | Quantity of EG | Quantity of diamine | % KCl | Phases |
|---|---|---|---|---|---|---|
| 6.1 | polyol A | 20 | — | 20 | 0.36 | 1 |
| 6.2 | polyol A | 40 | — | 20 | 0.31 | 1 |
| 6.3 | polyol A | none | 20–40 | 20 | none | 2 (comparison) |
| 6.4 | polyol F | none | 20–30 | 20 | none | 2 (comparison) |
| 6.5 | polyol F | 20 | — | 10 | 0.38 | 1 |
| 6.6 | polyol F | 20 | — | 20 | 0.36 | 1 |
| 6.7 | polyol F | 20 | — | 30 | 0.33 | 1 |
| 6.8 | polyol F | 30 | — | 10 | 0.36 | 1 |
| 6.9 | polyol F | 30 | — | 20 | 0.33 | 1 |
| 6.10 | polyol F | 30 | — | 30 | 0.31 | 1 |
| 6.11 | polyol F | 40 | — | 10 | 0.33 | 1, highly viscous |
| 6.12 | polyol F | 50 | — | 10 | 0.31 | 1, highly viscous |
| 6.13 | polyol F | 30 | — | 5 | 0.37 | 1, highly viscous |

EXAMPLE 7

In this Example, mixtures of polyol F and polyether polyols or polyether polyamines without any ethylene oxide units were mixed with EG/KCl-solutions. The results are given in Table 4.

TABLE 4

| Polyether F | Co-polyether | EG/KCl-solution, 5% | EG | % KCl | Phases |
|---|---|---|---|---|---|
| 50 parts | 50 parts of polyether H | — | 20 | 0 | 2 (for comparison) |
| 50 parts | 50 parts of polyether H | 10 | — | 0.83 | 1 |
| 50 parts | 50 parts of polyether H | 20 | — | 1.4 | 1 |
| 50 parts | 50 parts of polyether I | — | 20 | 0 | 2 (for comparison) |
| 50 parts | 50 parts of polyether I | 20 | — | 1.4 | 1 |
| 70 parts | 30 parts of polyether K | — | 20 | 0 | 2 (for comparison) |
| 70 parts | 30 parts of polyether K | 20 | — | 1.4 | 1 |
| 70 parts | 30 parts of polyether-polyamine L | — | 20 | 0 | 2 (for comparison) |
| 70 parts | 30 parts of polyether-polyamine L | 20 | — | 1.4 | 1 |

Polyether H: a propylene glycol having an OH number of 56
Polyether I: a polypropylene glycol having an OH number of 42, in which 48% of all the OH groups have been converted into primary amino groups by ammonia-pressure treatment
Polyether K: same as polyether I, but with a degree of amination of 80%
Polyether-Polyamine L: same as polyether I, but with a degree of amination of 100%

EXAMPLE 8

If 150 parts of a polyether having an OH number of 35, of the type formed by the addition of 82.5% by weight of propylene oxide and then 17.5% by weight of ethylene oxide on to trimethylol propane, are mixed with 60 parts of ethylene glycol, a two-phase mixture is obtained; but when 60 parts of a 5% solution of KCl in ethylene glycol are used, an optically clear, one-phase stable solution is obtained.

EXAMPLE 9

If (a) 150 parts of a polyether having an OH number of 28, of the type formed by the addition of a mixture of 70% by weight of propylene oxide and 30% of ethylene glycol on to propylene glycol, or (b) 150 parts of a polyether having an OH number of 20.7, of the type formed by the addition of 70% by weight of propylene oxide and then 30% by weight of ethylene oxide on to propylene glycol, or (c) 150 parts of a polyether having an OH number of 29, of the type formed by the addition of 50% by weight of propylene oxide, then 30% by weight of ethylene oxide, then 15% by weight of propylene oxide and then a further 5% of ethylene oxide on to trimethylol propane, are mixed with 60 parts by weight of ethylene glycol a two-phase, cloudy mixture is obtained, and also when 60 parts of glycerol are used instead of 60 parts of ethylene glycol.

If however 5% by weight solutions of KCl in ethylene glycol or glycerol are mixed with the polyether polyols clear, stable, one-phase solutions are obtained, the solutions with the last-mentioned polyether being distinguished by a particularly low viscosity.

EXAMPLE 10

An NCO prepolymer having an NCO content of 2.1% by weight is prepared from 2600 parts of a polyether having an OH number of 29, of the type formed by the addition of 50% by weight of propylene oxide, then 30% by weight of ethylene oxide, then 15% by weight of propylene oxide and then a further 5% by weight of ethylene oxide, and 234 g of 2,4 diisocyanatotoluene, by stirring for 4 hours at 80° C. From this NCO prepolymer a so-called aminopolyether is produced as follows:

1.415 kg of the above prepolymer are added to a preintroduced mixture of 40.4 g of NaOH, 1.5 l of water and 0.5 g of Mersolat ® H (emulsifier product from Bayer AG, D-509 Leverkusen), at an internal temperature of 20° C., which is maintained by cooling by means of an ice bath, with intensive stirring over a period of 30 min. After the addition has ended the mixture is stirred for 15 minutes at room temperature and then for 1 h at 80° C. The water is distilled off at 100° C./15 min, and the remaining viscous residue is filtered off by suction.

The resulting product has an NH number of 30 mg KOH/g (acetic anhydride method) a TDA content of 0.548% by weight and a viscosity of 1600 mPa.s.

150 g of this aminopolyether produce (a) a two-phase mixture with 60 g of ethylene glycol; but (b) a one-phase, optically clear, stable mixture, with 60 g of a 5% ethylene glycol(KCl solution (a=comparative test; b=according to the invention)

EXAMPLE 11

If a polyether having an OH number of 29, of the type formed by the addition of 50% by weight of propylene oxide, then 30% by weight of ethylene oxide, then 15% by weight of propylene oxide and then 5% by weight of ethylene oxide on to trimethylol propane, is used:

TABLE 5

| polyether (parts) | ethylene glycol (parts) | ethylene glycol 5% KCl (parts) | phases | viscosity |
|---|---|---|---|---|
| 80 | — | 20 | 1 | 1200 mPa.s/25° C. |
| 80 | 5 | 15 | 1 | 1200 mPa.s/25° C. |
| 80 | 10 | 10 | 1 | 1100 mPa.s/25° C. |

EXAMPLE 12

From a polyether having an OH number of 29, produced by the successive addition of 50% by weight of propylene oxide, 30% by weight of ethylene oxide, 15% by weight of propylene oxide and 5% by weight of ethylene oxide on to trimethylol propane, two aminopolyethers containing aliphatic, essentially primary amino groups are prepared by reaction with ammonia under pressure, the degree of conversion for the conversion of OH into $NH_2$ groups being in the one case 73% and in the other case 83%.

Both aminopolyethers (containing residual content of hydroxyl groups of 27% and 17%, respectively) produce two-phase cloudy mixtures with ethylene glycol (80 parts of aminopolyether to 20 parts of ethylene glycol, but optically clear, one-phase, stable solutions having a relatively low viscosity, when mixed with ethylene glycol containing 2% KCl.

EXAMPLE 13

A mixture of 95 parts of a polyether having an OH number of 27 (prepared by the addition of 78% of propylene oxide and then 22% of ethylene oxide on to trimethylol propane) and 23.5 parts of ethylene glycol has two phases and is cloudy.

If 0.7 g of the potassium salt of dimethylolpropionic acid and 3 g of the potassium salt of the propoxylated adduct of 2-butene-1,4-diol and $KHSO_3$ (MG 304) are used (as a solution in ethylene glycol) one-phase clear solutions having a very low viscosity are obtained. If, on the other hand, homogenisation is carried out by the addition of KCl (instead of the incorporable potassium salts) the viscosities of the mixtures are higher.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition which is a homogeneous storage stable salt containing mixture having a high mixed hydroxyl number and/or mixed hydroxyl amine number and a high content of polyols having a molecular of from 62 to 399 comprising:
   (a) a polyoxyalkylene polyol based on an alkyloxirane which polyol has a molecular weight of from 400 to 12,000 and/or polyolamine based on an alkyloxirane which polyolamine has a molecular weight of from 400 to 12,000 and/or polyamine based on an alkyloxirane which polyamine has a molecular weight of from 400 to 12,000,
   (b) a polyol containing at least two hydroxyl groups and having a molecular weight of from 62 to 399 which polyol when combined only with compound (a) does not form a mixture which remains homogeneous and (c) a solution-promoting additive selected from salts of cations of the first, second an third Main Groups of the Periodic System of Elements, ammonium ions, monoalkylammonium ions, dialkylammonium ions, trialkylammonium ions and tetraalkylammonium ions and of anions formed by removing at least one proton from an acid having a $K_s$-value of at least $10^{-7}$ in which for every 100 parts of (a) there are from 1 to 200 parts by weight (b) and form 0.01 to 10 parts by weight (c).

2. The composition of claim 1 in which (a) contains from 5 to 80 wt % oxyethylene segments.

3. The composition of claim 1 in which (a) contains primary amino and/or secondary amino and/or —O—(CH$_2$)$_3$—NH$_2$ groups as reactive groups.

4. The composition of claim 1 in which (a) is based on propylene oxide.

5. The composition of claim 1 which further comprises (d) a difunctional and/or polyfunctional compound containing isocyanate-reactive hydrogen atoms and having a molecular weight of from 32 to 12,000 which compound (d) is different from both (a) and (b).

6. The composition of claim 5 in which (d) is present in an amount of up to 40 parts by weight for every 100 parts by weight of (a).

7. The composition of claim 5 in which (d) is an aromatic diamine.

8. The composition of claim 5 which further comprises an internal mold release agent, a surface modifying agent, a cell stabilizer or a combination thereof.

9. The composition of claim 1 in which (a) is a polyoxyalkylene diol and/or polyoxyalkylene triol containing from 10 to 50 wt % oxyethylene segments.

10. The composition of claim 1 in which (b) is ethylene glycol and/or 1,4-butanediol.

11. The composition of claim 1 in which (c) is selected from the group consisting of alkali metal salts of monocarboxylic acids having 1 to 8 carbon atoms, alkali metal salts of polycarboxylic acids which may contain additionally one or more OH-groups and/or primary and/or secondary amino groups and/or mercapto groups, alkali metal salts of hydrohalic acids, aklali metal salts of thiocyanic acid and/or hydrocyanic acid and/or hydroisocyanic acid, alkali metal salts of sulfuric acid, alkali metal salts of nitric acid, alkali metal salts of phosphoric acid, alkaline earth metal salts of monocarboxylic acids having 1 to 8 carbon atoms, alkaline earth metal salts of polycarboxylic acids, which may contain additionally one or more OH-groups and/or primary and/or secondary amino groups and/or mercapto groups, alkaline earth metal salts of hydrohalic acids, alkaline earth metal salts of thiocyanic acid and/or hydrocyanic acid and/or hydroiscoyanic acid, alkaline earth metal salts of sulfuric acid, alkaline earth metal salts of nitric acid, alkaline earth metal salts of phosphoric acid, tetraklylammonium salts of monocarboxylic acids having 1-8 carbon atoms, tetraalkylammonium salts of polycarboxylic acids which may contain additionally one or more OH-groups and/or secondary amino groups and/or mercapto groups, tetraalkyammonium salts of hydrohalic acids, tetraalklammonium salts of thiocyanic acid and/or hydrocyanic acid an/or hydroisocyanic acid, tetraalkylammonium salts of sulfuric acid, tetraaklylammonium salts of nitric acid, tetraalkammonium salts of phosphoric acid and mixtures thereof.

12. The composition of claim 1 in which (c) is selected from the group consisting of sodium salts of carboxylic acids having 1 to 8 carbon atoms which may contain additionally one or more OH-groups and/or primary and/or secondary amino groups and/or mercapto groups, sodium salts of hydrohalic acids, sodium salts of thiocyanic acid and/or hydrocyanic acid and/or hydroisocyanic acid, potassium salts of carboxylic acids having 1 to 8 carbon atoms, potassium salts of hydrohalic acids, potassium salts of thiocyanic acid and/or hydrocyanic acid and/or hydroisocyanic acid and mixtures thereof.

13. The composition of claim 12 in which (c) is used in a quantity of from 0.01 to 5 parts by weight for every 100 parts by weight of (a).

14. The composition of claim 1 in which (c) is potassium acetate and/or potassium chloride.

15. The composition of claim 1 which further comprises an internal release agent and/or surface modifying agent and/or cell stabilizer.

16. A process for the production of polyisocyanate-addition products in which the composition of claim 1 is reacted with a polyisocyanate.

17. The process of claim 16 in which an isocyanate-reactive component which is different from the composition of claim 1 is also included as a reactant.

18. The composition of claim 1, in which (c) is selected from potassium 2,2-dimethylolpropionate or mono- to tetra-oxalkylation products of the adduct of Na- or K-bisulfite onto 2-butene-1,4-diol, potassium salts of mono- or polysulphonic acids or mono- or polycarboxylic acids containing 1 to 3 hydroxyl and/or amino groups.

19. The composition of claim 1, in which (a) is selected from polyoxyalkylene diols or from polyoxyalkylene triols which contain from 5 to 80% by weight of predominantly or exclusively terminal oxyethylene segments and in which from 0 to 100% of the hydroxyl groups are replaced by primary and/or secondary amino groups and/or O(CH$_2$)$_3$-NH$_2$-groups and in which the remaining oxyalkylene groups consist of oxypropylene groups.

20. The composition of claim 1, in which (a) is selected from polyoxyalkylene polyols which contain predominantly or exclusively internal oxyethylene blocks, in quantities of 5–80% and which contain at the same time 0–15% by weight of terminal oxyethylene groups, and in which the remaining oxyalkylene groups are oxypropylene groups.

21. The composition of claim 1, in which (a) is selected from that polyoxyalkylene polyols in which the oxyethylene radicals are incorporated in random distribution in the polyoxyalkylene polyols.

* * * * *